(12) United States Patent
Anzaldua (10) Patent No.: US 11,818,125 B1
(45) Date of Patent: *Nov. 14, 2023

(54) MUTUAL AUTHENTICATION SYSTEM

(71) Applicant: United Services Automobile Association (USAA), San Antonio, TX (US)

(72) Inventor: Steven Anzaldua, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 130 days.

This patent is subject to a terminal disclaimer.

(21) Appl. No.: 17/698,411

(22) Filed: Mar. 18, 2022

Related U.S. Application Data

(63) Continuation of application No. 16/837,921, filed on Apr. 1, 2020, now Pat. No. 11,316,849.

(60) Provisional application No. 62/829,569, filed on Apr. 4, 2019.

(51) Int. Cl.
*H04L 29/06* (2006.01)
*H04L 9/40* (2022.01)

(52) U.S. Cl.
CPC ........ *H04L 63/0869* (2013.01); *H04L 63/083* (2013.01); *H04L 63/0853* (2013.01); *H04L 63/0861* (2013.01)

(58) Field of Classification Search
None
See application file for complete search history.

(56) References Cited

U.S. PATENT DOCUMENTS

| | | | |
|---|---|---|---|
| 6,711,400 B1 | 3/2004 | Aura | |
| 8,554,674 B1 * | 10/2013 | Subealdea, Jr. | G06Q 40/02 705/40 |
| 9,706,401 B2 * | 7/2017 | Vincent | G06F 21/34 |
| 10,149,156 B1 | 12/2018 | Tiku et al. | |
| 10,154,025 B2 | 12/2018 | Tinnakornsrisuphap et al. | |

(Continued)

OTHER PUBLICATIONS

Alexandre Alapetite, "Dynamic 2D-barcodes for multi-device Web session migration including mobile phones", Technical University of Denmark, Department of Management Engineering Produktionstorvet 426-A, DK-2800 Kongens Lyngby, Denmark, doi: 10.1007/ s00779-009-0228-5. (Year: 2010).

*Primary Examiner* — Piotr Poltorak
(74) *Attorney, Agent, or Firm* — Potomac Law Group, PLLC (57) ABSTRACT

Mutual authentication techniques are described in this patent document. For example, when a first person calls a second person, neither of them know that the other person is who he or she says he or she is. Thus, after a second person receives the call, the second person is asked to authenticate himself or herself using a user device. After the second person logs into his or her account, the second person can input on the user device a one-time passcode to authenticate the first person. The user device sends the passcode to an authentication server that allows the first person to send back the inputted one-time passcode to the second person. Upon receiving the inputted one-time passcode, the second person can use his or her user device to indicate that the one-time passcode is correct so that the second person can be authenticated to access the first person's account.

20 Claims, 6 Drawing Sheets

(56) References Cited

U.S. PATENT DOCUMENTS

| | | |
|---|---|---|
| 10,218,695 B1 * | 2/2019 | Jain .................. H04L 63/102 |
| 10,445,732 B2 | 10/2019 | Oberheide et al. |
| 10,659,459 B1 | 5/2020 | Gadwale |
| 2003/0110381 A1 | 6/2003 | Aoshima et al. |
| 2006/0053296 A1 | 3/2006 | Busboom et al. |
| 2011/0149867 A1 | 6/2011 | Rudolf et al. |
| 2011/0219427 A1 | 9/2011 | Hito et al. |
| 2011/0270751 A1 | 11/2011 | Csinger et al. |
| 2012/0198531 A1 | 8/2012 | Ort et al. |
| 2013/0262857 A1 | 10/2013 | Neuman et al. |
| 2014/0223516 A1 | 8/2014 | Vongsouvanh et al. |
| 2014/0230039 A1 | 8/2014 | Prakash et al. |
| 2015/0334108 A1 | 11/2015 | Khalil et al. |
| 2017/0068958 A1 | 3/2017 | Oberheide et al. |
| 2017/0250974 A1 | 8/2017 | Antonyraj et al. |
| 2018/0034798 A1 | 2/2018 | Vincent et al. |
| 2018/0041339 A1 | 2/2018 | Lee |
| 2018/0332042 A1 | 11/2018 | Yu et al. |
| 2019/0074972 A1 | 3/2019 | Shastri et al. |
| 2019/0297075 A1 * | 9/2019 | Kaladgi .................. G06F 21/34 |
| 2019/0312726 A1 * | 10/2019 | Sierra .................. H04L 63/104 |
| 2019/0386984 A1 * | 12/2019 | Thakkar .................. H04L 63/18 |
| 2020/0029268 A1 | 1/2020 | Russell et al. |
| 2020/0236113 A1 | 7/2020 | Monica et al. |
| 2021/0152689 A1 | 5/2021 | Gayaldo |

\* cited by examiner

MUTUAL AUTHENTICATION SYSTEM

CROSS-REFERENCE TO RELATED APPLICATIONS

This application is a continuation of U.S. application Ser. No. 16/837,921, entitled "MUTUAL AUTHENTICATION SYSTEM", which was filed on Apr. 1, 2020, which claims priority to U.S. Provisional Patent Application No. 62/829,569, entitled "MUTUAL AUTHENTICATION SYSTEM", which was filed on Apr. 1, 2019, both of which are herein incorporated by reference for all purposes.

TECHNICAL FIELD

This disclosure is directed generally to systems, methods, and apparatus for performing authentication.

BACKGROUND

When a customer calls an organization's customer service phone number, he or she is asked to provide certain personal information about him or her so that a customer service representative can determine that the customer is who he or she says. In this way, a customer service representative can authenticate the identity of the customer calling. In some cases, customer service representatives call customers for marketing purposes (e.g., to sell additional products or finalize transaction), for notification purposes (e.g., to notify a customer of a suspected credit card fraud) or to collect information for a service or product they are providing. Customers who receive such calls may implicitly trust the customer service representative at least because the customer service representative's claim that he or she belongs to a trustworthy organization (e.g., the customer's bank) or because of the reason for the customer service perspective's call (e.g., to notify of a credit card fraud). Fraudsters know about this phenomenon and call the customers pretending to be affiliated with the organization that the customer trusts. Thus, customers who receive such calls are susceptible to having their personal sensitive information stolen by the fraudsters.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

When a customer receives a call from a customer service representative (CSR) of a trustworthy organization (e.g., the customer's bank) the customer is unable to verify that the CSR is who he or she says. In some cases, fraudsters have been known to steal personal information and use it for nefarious purposes (e.g., taking out loans, filing fake tax returns, having a credit card sent to the fraudster's address). In a specific example, a fraudster can steal account login and password information that belongs to a customer, log into the customer's account, initiate a transaction that triggers a one-time code (OTC) being sent to the customer's mobile device, and then call the customer pretending to the be the CSR to obtain the OTC. The fraudster can then use the OTC for authentication and proceed with a transaction.

To address at least this problem, this patent document describes technology that can allow two persons to perform mutual authentication when a first person (e.g., a CSR) calls a second person (e.g., a customer). For example, after a second person receives the call, the second person is asked to authenticate himself or herself using a user device (e.g., via a mobile device application or via a web browser). After the second person logs into his or her account, the second person can input on the user device a one-time passcode to authenticate the first person. The user device sends the passcode to a server that allows the first person to read back the inputted one-time passcode to the second person. Upon receiving the inputted one-time passcode, the second person can use his or her user device to indicate that the one-time passcode is correct so that the second person can be authenticated to access the first person's account. In this way, the second person is authenticated as well because the first person verifies that the second person accessed (e.g., in some cases provided authentication information to obtain access) to the mobile application or web portal to input the one-time passcode.

In this patent document, the terms "customer service representative" and "customer" are used to simplify the description of the example mutual authentication techniques. However, the mutual authentication techniques described in this patent document can be applied in context other than where a customer service representative belonging to an organization (e.g., company) calls a customer of that organization. For example, a person can verify that it is indeed a governmental agency calling to verify benefits or obtain information when a governmental agency calls the person.

Figure 1A:
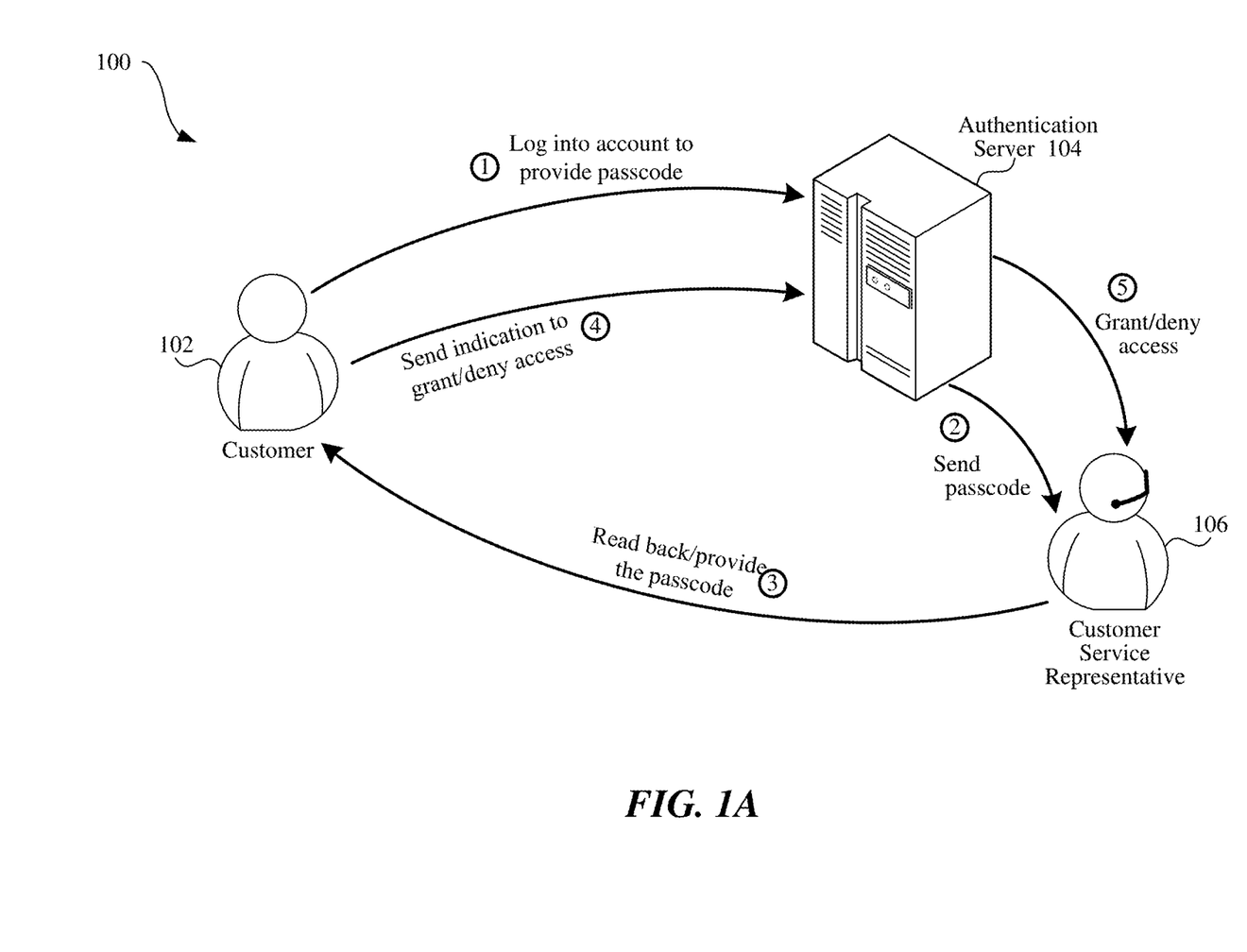
FIG. 1A shows an example overview of operations performed in a mutual authentication system.

FIG. 1A shows an example overview of operations performed in a mutual authentication system 100. In an example scenario, a CSR 106 can initiate a call to speak to a customer 102. On the call, the CSR 106 can identify himself or herself as belonging to an organization or company. The CSR 106 can ask the customer 102 to authenticate himself or herself on a device associated with the customer 102. At operation 1, the customer 120 logs into his or her account to provide a passcode to an authentication server 104. The passcode can include numbers, letter, symbols, or any combination thereof. For example, the passcode may be 123456 or Bird.

At operation 1, the customer 102 can log into his or her account in a variety of ways. For example, the customer can log into his or her account on a web browser operating on the customer's computer or on the customer's mobile device (e.g., smartphone). In another example, the customer 102 can log into his or her account on an application operating on the customer's mobile device. By logging into the customer's account, the customer can authenticate himself or herself. Once the customer logs into his or her account, the customer's device can provide a passcode to the authentication server 104.

At operation 2, the authentication server 104 sends the passcode to the CSR's computer. At operation 3, the CSR 106 can read back the passcode to the customer 104 via the call or the CSR 106 can input the code such that it appears on the customer's mobile application, web browser, in a push notification or text message. At operation 4, the customer 102 can use his or her device to send to the authentication server 104 an indication as to whether the CSR is granted to denied access to the customer's account. For example, if the customer 102 determines that the passcode repeated or sent by the CSR matches the passcode entered by the customer 102, then the customer can press a "grant" button on a graphical user interface (GUI) displayed on the customer's device to indicate to the authentication server 104 that the CSR is granted access to the customer's account. Conversely, if the customer 102 determines that the passcode repeated by the CSR does not match the passcode entered by the customer 102, then the customer can press a "deny" button on a graphical user interface (GUI) displayed on the customer's device to indicate to the authentication server 104 that the CSR is denied access to the customer's account.

At operation 5, the authentication server 140 can either grant or deny the CSR access to the customer's account based on the indication (e.g., grant/deny) received from the customer's device.

Figure 1B:
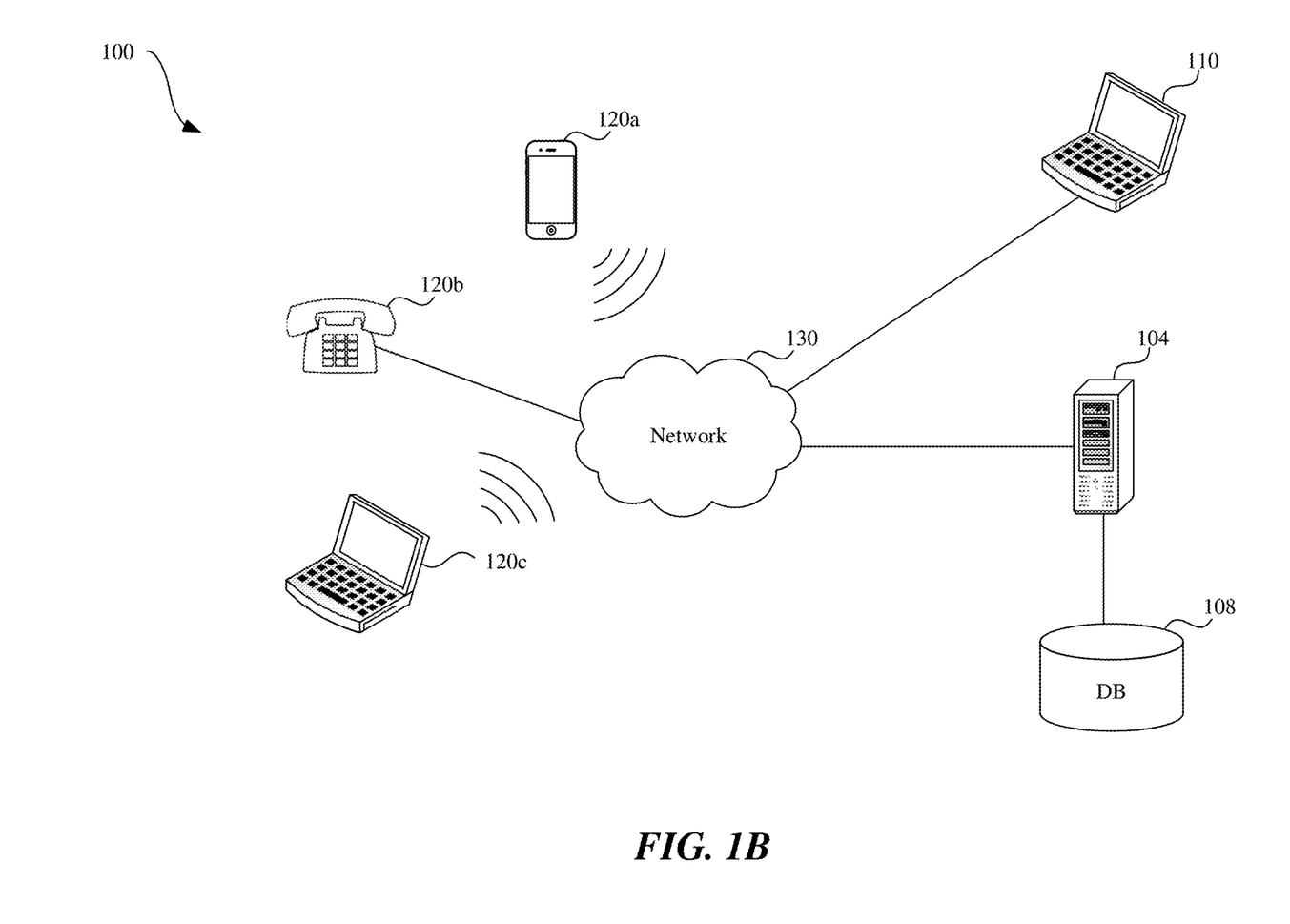
FIG. 1B shows an example block diagram of a mutual authentication system.

FIG. 1B shows an example block diagram of a mutual authentication system 100 that includes a CSR's computer 110 and/or phone that can initiate a call to speak to a customer via the customer's device 120a-120c (e.g., laptop, phone, wearable, or smartphone). The call from the CSR's computer 110 or phone can be sent to the customer's device 120a-102c via a communication network 130. The communication network 130 may include the Internet, a cellular network, a public switched telephone network (PSTN), a voice over Internet Protocol (VOIP) network, or any combination thereof. This patent document describes various operations performed by an authentication server 104. In some embodiments, a single server can perform the operations described for the authentication server 104. In some other embodiments, multiple servers can perform the operations described for the authentication server 104. As further explained in this patent document, the authentication server 104 can store information to and retrieve information from the database 108.

Figure 2:
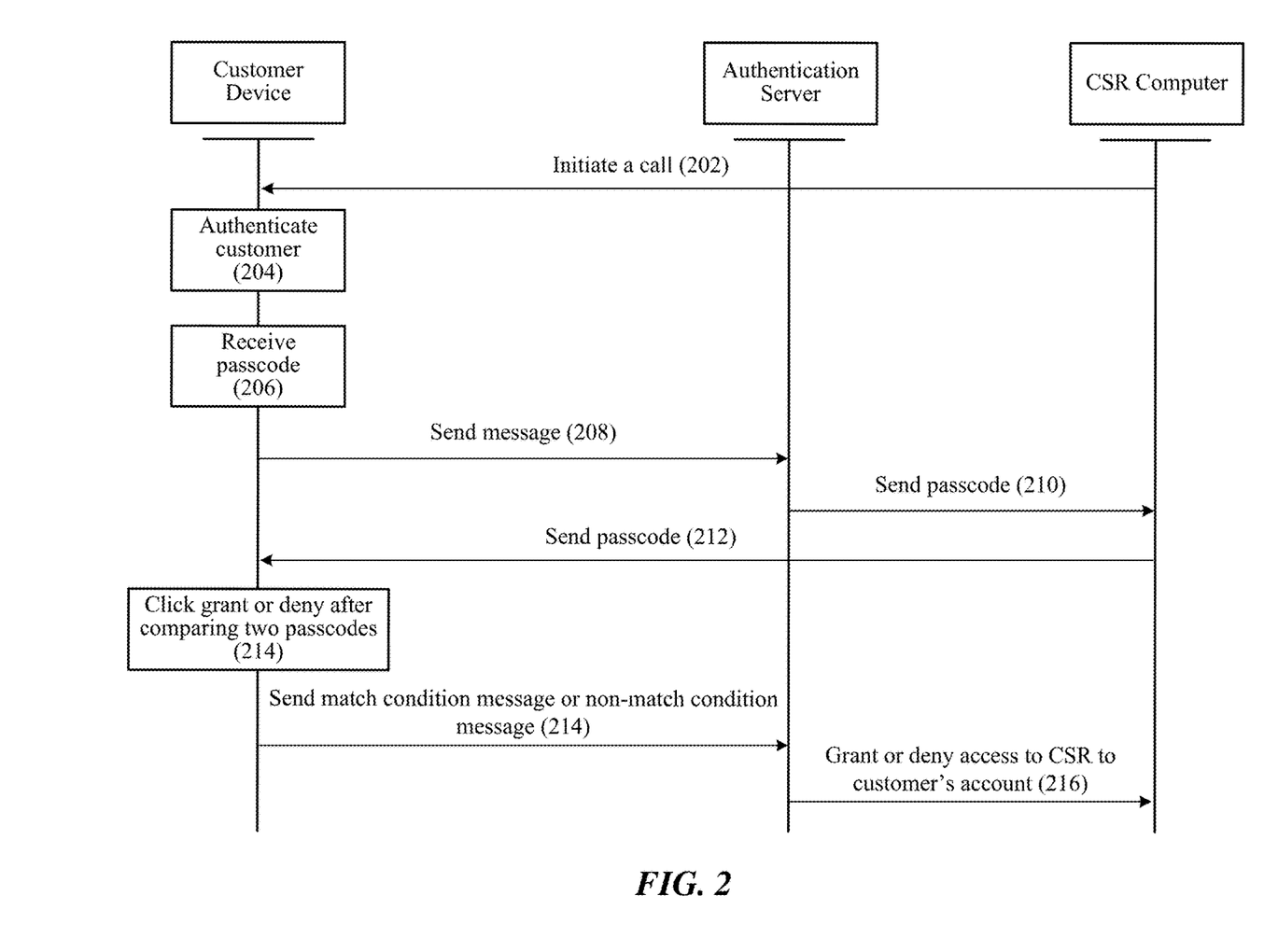
FIG. 2 shows an example sequence diagram of the operations performed by devices in the mutual authentication system.

FIG. 2 shows an example sequence diagram of the operations performed by devices in the mutual authentication system. The operations described in steps 202 to 216 are performed during the time that the CSR is on a call (or other interactions) with the customer. At step 202, a CSR's computer or phone device can initiate a call (e.g., phone call) to a customer device. At operation 204, the customer is authenticated to access his or her account via the device based on information provided by the customer. For example, the customer may authenticate himself or herself by entering his or her login information (e.g., biometric information, or personal identification number, or username and password) in a web browser or in a mobile application operating on the customer's device.

The customer may be authenticated using one of several authentication techniques. In some embodiments, the customer's device may compare the login information provided by the customer to login information previously stored on the customer device. In such embodiments, if the customer's device determines that the provided login information is the same as the previously stored login information, then the customer device may authenticate the customer to access his or her account on the customer device. In some other embodiments, the customer's device may send the login information to an authentication server so that the authentication server can compare the login information provided by the customer to login information previously stored on a database associated with the authentication server. In such embodiments, if the authentication server determines that the provided login information is the same as the previously stored login information, then the authentication server can send a message to the customer device indicating that the customer is authenticated to access his or her account on the customer device. In yet some other embodiments, a customer may be authenticated by other interactions such as receiving a text message with a one-time code (OTC) and then entering that OTC in the customer device.

After the customer logs into his or her account, the customer device may show an option for the customer to authenticate the customer service representative (e.g., on a separate tab in a mobile application, in a pop-up message on a web browser, in a push notification). Upon selection of that option, at operation 206, the customer device prompts the customer to provide a passcode. After the customer enters the passcode, the customer device can generate a message that includes the passcode and an account identifier associated with the account of the customer (e.g., account number, member number or login information). At operation 208, the customer device sends the message to the authentication server. In some embodiments, the customer device encrypts the message prior to sending the message to the authentication server.

At operation 210, the authentication server sends the passcode to the CSR's computer. The authentication server may send the passcode to the CSR's computer using one of several techniques. For example, once the authentication server receives the passcode, it sends the passcode to the CSR's computer without receiving any further request from the CSR's computer. In another example, after the customer mentions to the CSR that he or she has entered the passcode in the customer device, the CSR may request and obtain the passcode from the authentication server. In some embodiments, after the passcode is received by the CSR's computer, the passcode is display on the CSR's computer so that the CSR can verbally mention the passcode to the customer over the call. In some other embodiments, after the passcode is received by the CSR's computer, the passcode is sent by the CSR's computer to the mobile application operating on the customer's device.

At operation 214, the customer device displays or audibly presents to the customer the passcode sent by the CSR or the CSR's computer. The customer can compare the password that he or she entered at operation 206 with the passcode that was sent at operation 212. If the customer determines that the two passcodes match, the customer can select a "grant" button on a GUI operating on the customer device. After the customer clicks the "grant" button, the customer device sends a match condition message to the authentication server at operation 214, where the match condition message indicates the two passcodes were determined to be the same. The match condition message may be another message (e.g., a data packet) that includes information to indicates that the two passcodes were determined to be the same.

Conversely, if the customer determines that the two passcodes do not match, the customer can select a "deny" button on a GUI operating on the customer device. After the customer clicks the "deny" button, the customer device sends a non-match condition message to the authentication server at operation 214, where the non-match condition message indicates the two passcodes were determined to be different. The non-match condition message may be another message (e.g., a data packet) that includes information to indicate that the two passcodes are different.

In some embodiments, instead of using "grant" and "deny" buttons, the GUI may have two buttons that state "passcodes are same" and "passcodes are different." The selection of either the "passcodes are same" or "passcodes are different" buttons by the customer can trigger to the customer device to respectively send either the match condition message or the non-match condition message to the authentication server. In some embodiments, the customer device can encrypt the match condition message or the non-match condition message prior to sending any one of them to the authentication server.

At operation 216, the authentication server can determine either to allow the CSR access to the customer's account or to deny the CSR access to the customer's account. In response to receiving the match condition message, which is sent to the authentication server when the two passcodes are the same, the authentication server authenticates the CSR to access the account associated with the customer. In some embodiments, the authentication server can send the account identifier to the CSR's computer at step 216 after receiving the match condition message. In some other embodiments, the authentication server can send the account identifier to the CSR's computer at operation 210, and at operation 216 allows the CSR's computer to access the account associated with the account identifier.

In response to receiving the non-match condition message, which is sent to the authentication server when the two passcodes are different, the authentication server denies the CSR access to the account associated with the customer. In some embodiments, the authentication server can send the account identifier to the CSR's computer at operation 216 after receiving the match condition message. In some other embodiments, the authentication server can send the account identifier to the CSR's computer at operation 210, and at operation 216 allows the CSR's computer to access the account associated with the account identifier.

In some embodiments, after operation 206 and prior to operation 208, the customer device may generate a unique identifier (e.g., randomly generate ID) that can be used to identify the call with the CSR. The unique identifier can be included in the message sent to the authentication server at operation 208. The authentication server can store the unique identifier in a database along with either the word "grant" or the word "deny." For example, if the authentication server receives a match condition message at step 214, the authentication server can log this event by storing the word "grant" next to the unique identifier associated with the call. In some embodiments, an employee identifier of the CSR can also be stored next to the unique identifier. In this way, a log can be generated to show the calls on which CSRs were allowed to access customer accounts, and the calls on which CSRs are denied access to customer accounts.

In some embodiments, the mutual authentication system may be designed to authenticate a CSR to access a customer account within a pre-determined duration of time after an event is triggered. For example, after the authentication server receives the message at operation 208, the operations performed at operations 210 to 214 should be performed within 2 minutes. If, for example, a match condition message is received by the authentication server at 2 minutes and 10 seconds after the message is received at operation 208, the authentication server can still deny the CSR access to the customer's account. Thus, a message received at operation 208 can be stored on the authentication server or on a database associated with the authentication server for a pre-determined duration of time (e.g., 2 minutes), where the CSR can be authenticated to access a customer's account if the match condition message is received by the authentication server within the pre-determined duration of time.

In some embodiments, the operations described in FIG. 2 can be performed only if the customer device and/or a mobile application on the customer device has been previously registered with the authentication server. In such embodiments, once a customer device and/or mobile application is registered, it can be qualified to perform the type of mutual authentication described in this patent document.

Figure 3:
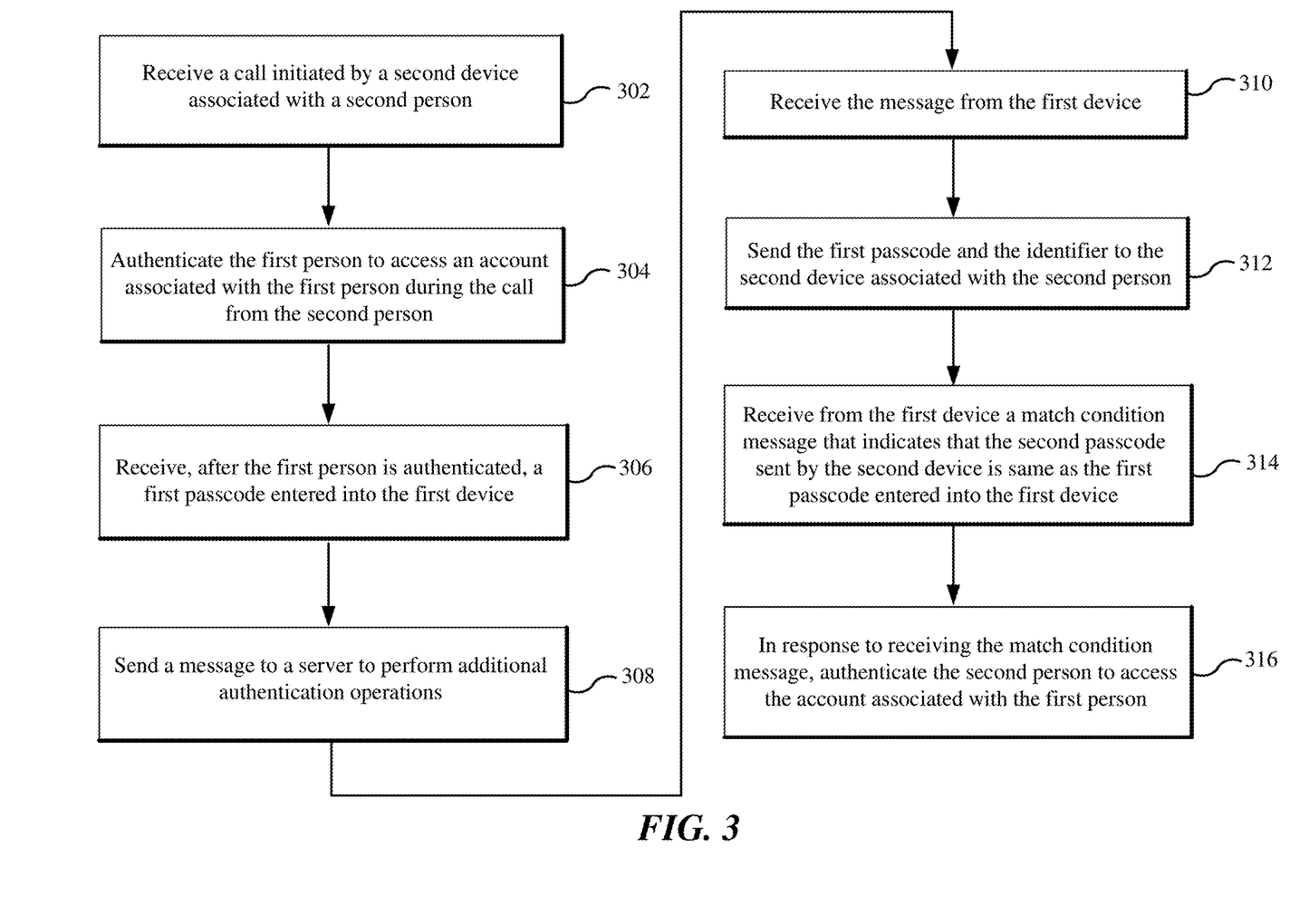
FIG. 3 is an example flow diagram of a mutual authentication process.

FIG. 3 is an example flow diagram of a mutual authentication process. Operations 302 to 308 are performed by a first device (e.g., smartphone or laptop) associated with a first person (e.g., a customer), and operations 310 to 316 are performed by a server (e.g., an authentication server). At the receiving operation 302, the first device receives a call initiated by a second device (e.g., a computer and/or phone) associated with a second person (e.g., a customer service representative).

At the authentication operation 304, the first device authenticates the first person to access an account associated with the first person during the call from the second person. The first person is authenticated based on user information received via the first device. In some embodiments, the user information includes a personal identification number of the first person, or biometric information of the first person, or a user name and a password of the first person.

At the receiving operation 306, the first device receives, after the first person is authenticated, a first passcode entered into the first device. At the sending operation 308, the first device sends a message to a server to perform additional authentication operations, wherein the message includes an identifier associated with the account of the first person and the first passcode. In some embodiments, the message is encrypted by the first device prior to sending the message to the server.

At the receiving operation 310, the server (e.g., authentication server) receives the message from the first device. In some embodiments, the message includes a second identifier randomly generated by the first device, where the second identifier uniquely identifies the call when the first person is authenticated. In such embodiments, the server is configured to store the second identifier and either a grant designation in response to authenticating the second person to access the account or a deny designation in response to denying the second person access to the account. In some embodiments, the grant designation or the deny designation are stored in a manner that indicates a relationship with the second identifier. For example, the words "grant" or "deny" may be stored on a database next to the second identifier.

At the sending operation 312, the server sends the first passcode and the identifier to the second device associated with the second person, where a second passcode is sent by the second device via the call to the first device. In some embodiments, the first passcode and the second passcode include letters, numbers, or symbols.

At the receiving operation 314, the server receives from the first device a match condition message that indicates that the second passcode sent by the second device is same as the first passcode entered into the first device. At the authenticating operation 316, the server, in response to receiving the match condition message, authenticates the second person to access the account associated with the first person.

In some embodiments, the server of FIG. 3 is further configured to receive from the first device a non-match condition message that indicates that the second passcode sent by the second device is different from the first passcode entered into the first device. If the server receives the non-match condition message, the server denies the second person access to the account associated with the first person. In some embodiments, the first device is configured to encrypt the match condition message or the non-match condition message prior to sending the match condition message or the non-match condition message to the server.

In some embodiments, the message is stored on the server or on a database associated with a server for a pre-determined duration of time, and the second person is authenticated in response to receiving the match condition message within the pre-determined duration of time. In some embodiments, the first person is authenticated via an application operating on the first device or via an Internet browser operating on the first device.

Figure 4:
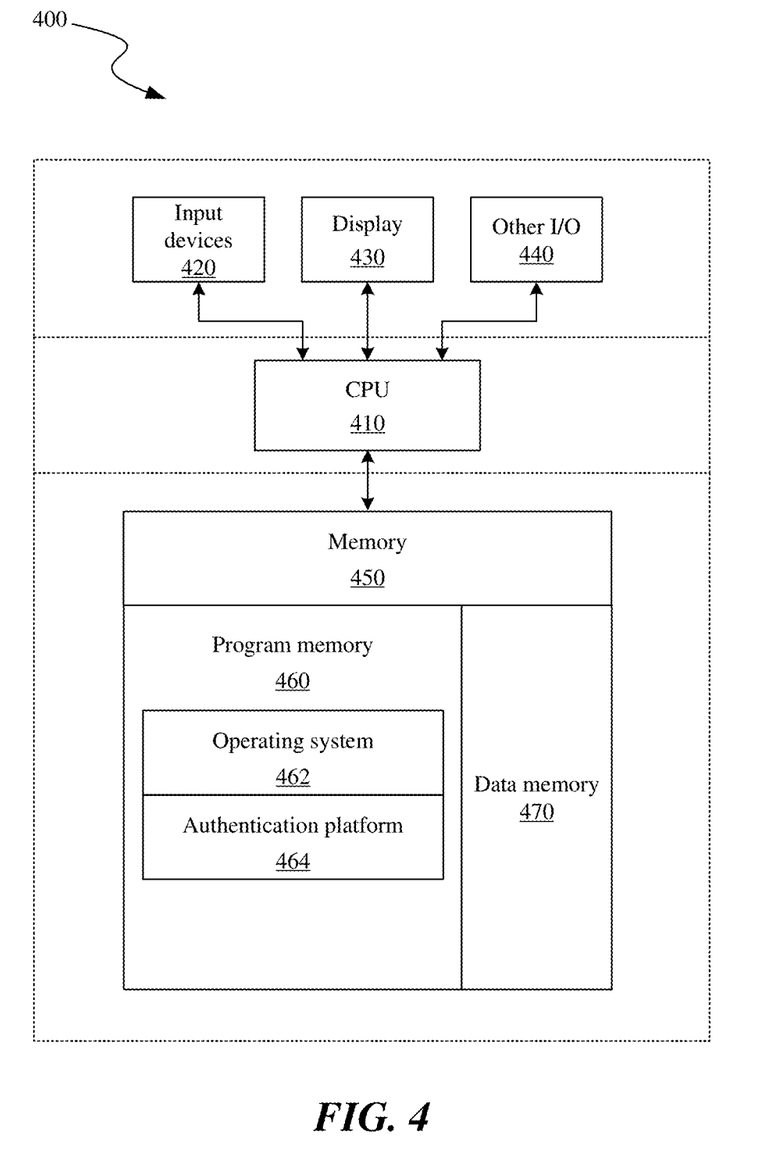
FIG. 4 is a block diagram illustrating an overview of devices on which some implementations of the authentication server or customer device (or user device) can operate.

FIG. 4 is a block diagram illustrating an overview of devices on which some implementations of the authentication server or customer device (or user device) can operate. The devices can comprise hardware components of a device 400, such as the authentication server or customer device, both of which can include an authentication platform 464 that determine whether a person is authenticated to access an account. For instance, one version of the authentication platform 464 operating on the authentication server can determine whether a customer service representative, as described in this patent document, is authenticated to access a customer's account. And, another version of the authentication platform 464 operating on the customer device can determine whether a customer, as described in this patent document, is authenticated to access the customer's device and to provide a passcode to the authentication servers for further authentication related operations.

Device 400 can include one or more input devices 420 that provide input to the CPU (processor) 410, notifying it of actions. The actions are typically mediated by a hardware controller that interprets the signals received from the input device and communicates the information to the CPU 410 using a communication protocol. Input devices 420 include, for example, a mouse, a keyboard, a touchscreen, an infrared sensor, a touchpad, a wearable input device, a camera- or image-based input device, a microphone, or other user input devices.

CPU 410 can be a single processing unit or multiple processing units in a device or distributed across multiple devices. CPU 410 can be coupled to other hardware devices, for example, with the use of a bus, such as a PCI bus or SCSI bus. The CPU 410 can communicate with a hardware controller for devices, such as for a display 430. Display 430 can be used to display text and graphics. In some examples, display 430 provides graphical and textual visual feedback to a person operating the device 400. In some implementations, display 430 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 440 can also be coupled to the processor, such as a network card, video card, audio card, USB, FireWire or other external device, camera, printer, speakers, CD-ROM drive, DVD drive, disk drive, or Blu-Ray device.

In some implementations, the device 400 also includes a communication device capable of communicating wirelessly or wire-based with a network node (e.g., a server) or with a user device (e.g., a laptop, desktop, or mobile device) or with one or more computers (e.g., desktop or laptop) associated with the customer service representatives. The communication device can communicate with another device or a server through a network using, for example, TCP/IP protocols. Device 400 can utilize the communication device to distribute operations across multiple network devices.

The CPU 410 can have access to a memory 450. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 450 can include program memory 460 that stores programs and software, such as an operating system 462 and authentication platform 464. The authentication platform 464 may include modules or processes or methods for authentication a person to access an account, as described in FIGS. 1, 2, 3 and 5 of this patent document and/or in the various embodiments in this patent document. Thus, for example, the memory 450 may store instructions that upon execution by CPU 410 configure the device 400 to perform the operations described for the authentication server in FIGS. 1, 2, 3, and 5 and/or in the various embodiments described in this patent document. In another example, the memory 450 may store instructions that upon execution by CPU 410 configure the device 400 to perform the operations described for the customer device (or user device) in FIGS. 1, 2, 3, and 5 and/or in the various embodiments described in this patent document. Memory 450 can also include data memory 470 that can include the various scores described in this patent document, which can be provided to the program memory 460 or any element of the device 400.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, portable electronic devices such as smartphones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 5:
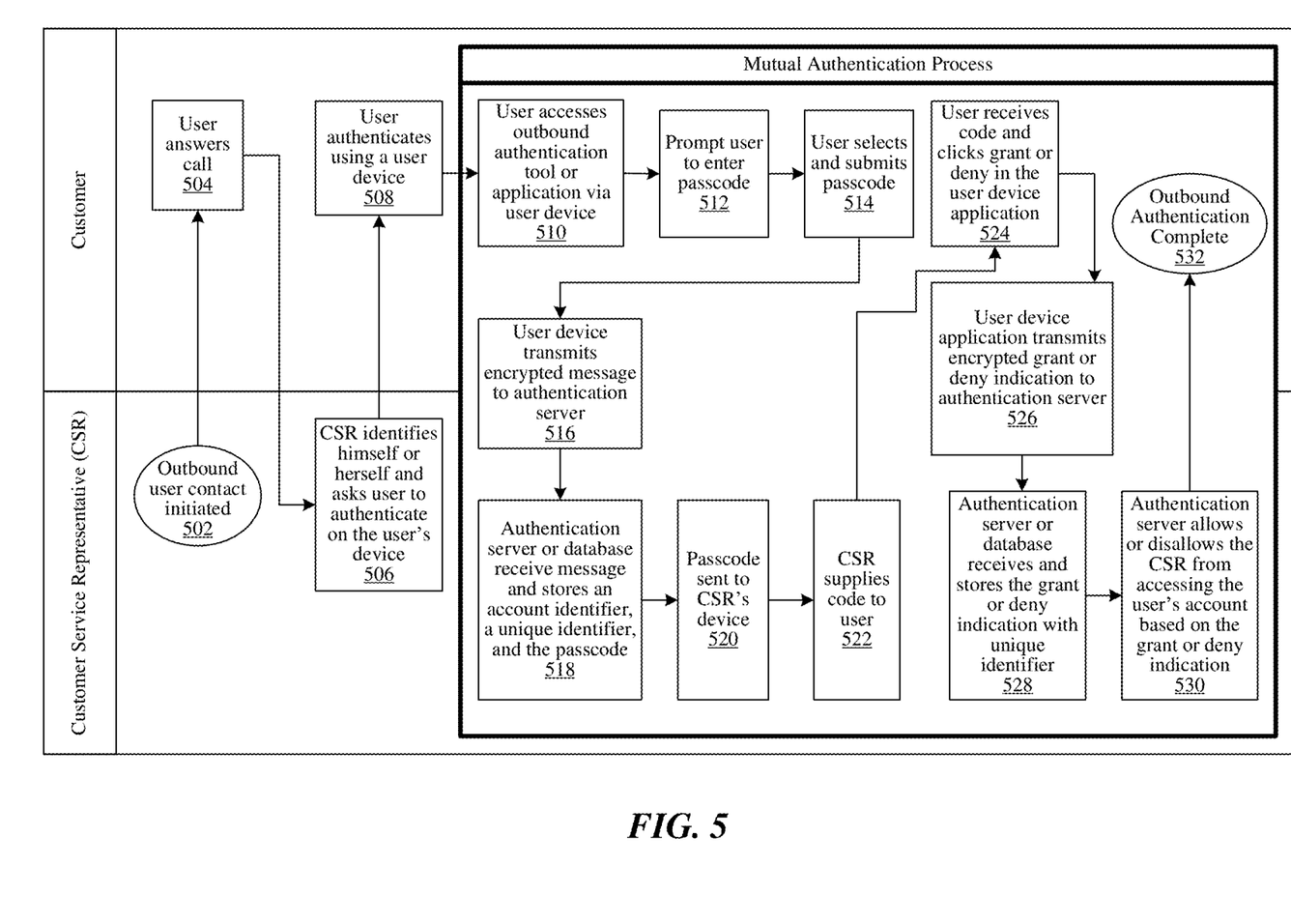
FIG. 5 is an example implementation of a flow diagram of a mutual authentication process.

FIG. 5 is an example implementation of a flow diagram of a mutual authentication process. The flow diagram of FIG.

5 describes a process that is designed to solve the technical problem of performing outbound authentication where a CSR calls a customer. At step 502, a CSR calls a customer, and at step 504, the customer answers the call. However, at step 504, the customer may most likely not recognize the CSR or may not be able to verify that the CSR is who he or she says he or she is. At the same time, when the customer answers the call at step 504, the CSR may not know that the customer is who he or she says he or she is.

After the customer answers the call at step 504, the CSR can identify himself or herself and can ask the customer to authenticate himself or herself on the customer's device. For example, the CSR may request the customer to enter his or her login information in a mobile application or a web browser operating on the customer's device.

At step 508, the customer logs into his or her account using a customer's device, and in so doing, authenticates himself or herself. The customer may log into his or her account by providing to the customer device the customer's biometric information or by providing a username and password. The mobile application or web browser operating on the customer device may include an "outbound authentication tool" or an "outbound authentication application" link. At step 510, the customer selects the outbound authentication tool or application link via a graphical user interface (GUI) displayed by the customer device. In response, at step 512, the outbound authentication tool or application requests the customer to enter a passcode via the GUI. At step 514, the user selects a passcode, which can include numbers, letter, symbols, or any combination thereof. In some embodiments, the passcode may be a four or six digit code for ease of use.

At step 516, after the user selects and enters his or her passcode, the customer device sends an encrypted message to an authentication server. The encrypted message can include the user's account identifier, the user selected passcode, and a unique identifier that can be used to identify the ongoing call between the CSR and the customer.

At step 518, the authentication server receives and can store in a database the account identifier, the unique identifier, and the passcode. At step 520, the authentication server sends the passcode to a computer or device associated with the CSR. At step 522, the CSR can read back the passcode to the customer via the call.

At step 524, the customer device can receive the code and can visually or audibly present the code to the customer. If the customer determines that the passcode provided by the CSR matches or is the same as the passcode that the customer entered, then the customer may select a "grant" button on the GUI displayed on the customer's device. If, however, the customer determines that the passcode provided by the CSR does not match or is different from the passcode that the customer entered, then the customer may select a "deny" button on the GUI displayed on the customer's device.

At step 526, the user device transmits an encrypted grant or deny message to the authentication server that indicates to the authentication server whether the customer has granted or denied access to the CSR to the customer's account. At step 528, the authentication server receives the encrypted grant or deny message and stores either the word "grant" or the word "deny" next to the unique identifier to create a log as to whether the CSR was granted or denied access to the customer's account for the call associated with the unique identifier. At step 530, the authentication server can either allow or deny the CSR from accessing the customer's account based on receiving either the grant message or the deny message. At step 532, the outbound authentication process is completed.

In an example embodiment, the above-described methods are embodied in the form of processor-executable code and stored in a computer-readable program medium. Thus, a non-transitory machine-readable medium having machine executable instructions stored thereon that, when executed by one or more processors, direct the one or more processors to perform a method described in FIGS. 1, 2, 3, and 5, and/or in the various embodiments described in this patent document.

Those skilled in the art will appreciate that the components illustrated in FIG. 1-5 described above, and in each of the flow diagrams, may be altered in a variety of ways. For example, the order of the logic may be rearranged, sub-steps may be performed in parallel, illustrated logic may be omitted, other logic may be included, etc. In some implementations, one or more of the components described above can execute one or more of the processes described above.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively.

Several implementations of the disclosed technology are described above in reference to the figures. The computing devices on which the described technology may be implemented can include one or more central processing units, memory, user devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

I claim:

1. A system for performing authentication, the system comprising:
   one or more processors; and
   one or more memories storing instructions that, when executed by the one or more processors, cause the computing system to perform a process comprising:
      receiving, by a first device associated with a first person, a call initiated by a second device associated with a second person;
      performing an authentication procedure for the first person, wherein the first person is authenticated based on user information received via the first device;
      receiving, after the first person is authenticated, a first passcode;
      sending a message that includes an identifier associated with an account of the first person and the first passcode;
      receiving a second passcode sent by the second device during the call;
      determining that the second passcode sent by the second device matches the first passcode; and
      verifying the call by sending a match condition message in response to the determination that the second passcode sent by the second device matches the first passcode.

2. The system of claim 1, wherein the match condition is sent to a server that is configured to, when the server receives a non-match condition message that indicates that there was not a match between passcodes, deny access, to a caller, to an account associated with the non-match condition message.

3. The system of claim 1, wherein the first passcode is randomly generated.

4. The system of claim 1, wherein the match condition is sent to a server that, in response to receiving the match condition, grants the second person to access the account of the first person.

5. The system of claim 1, wherein the sending the message that includes the identifier includes sending an encrypted version of the first passcode.

6. The system of claim 1, wherein the message that includes the identifier and the match condition are sent to a server that is configured to:
   store an indication of the message that includes the identifier for a pre-determined duration of time; and
   authenticate the second person in response to receiving the match condition message within the pre-determined duration of time.

7. The system of claim 1, wherein the first passcode and the second passcode include letters and numbers.

8. The system of claim 1, wherein the server is configured to, when the server receives a non-match condition message that indicates that there was not a match between passcodes, deny access, to a caller, to an account associated with the non-match condition message.

9. The system of claim 1, wherein the first passcode is randomly generated.

10. The system of claim 1, wherein the server, in response to receiving the match condition, grants the second person to access the account of the first person.

11. The system of claim 1, the message that includes the identifier includes an encrypted version of the first passcode.

12. The system of claim 1, wherein the server is configured to:
store an indication of the message that includes the identifier for a pre-determined duration of time; and
authenticate the second person in response to receiving the match condition message within the pre-determined duration of time.

13. The system of claim 1, wherein the first passcode and the second passcode include letters and numbers.

14. A method of performing authentication by a server, the method comprising:
receiving, by the server, a message that includes an identifier associated with an account of the first person and a first passcode, wherein a first device associated with a first person:
received a call initiated by a second device associated with a second person;
performed an authentication procedure for the first person, wherein the first person was authenticated based on user information received via the first device; and
received, after the first person was authenticated, the first passcode;
providing the first passcode to the second device, wherein the second device sends, to the first device, a second passcode during the call, and wherein the first device determines that the second passcode, sent by the second device, matches the first passcode; and
receiving a match condition that is in response to the determination that the second passcode sent by the second device matched the first passcode.

15. A computer-readable storage medium storing instructions that, when executed by a computing system, cause the computing system to perform a process for performing authentication, the process comprising:
receiving, by a first device associated with a first person, a call initiated by a second device associated with a second person;
performing an authentication procedure for the first person, wherein the first person is authenticated based on user information received via the first device;
receiving, after the first person is authenticated, a first passcode;
sending a message that includes an identifier associated with an account of the first person and the first passcode;
receiving a second passcode sent by the second device during the call;
determining that the second passcode sent by the second device matches the first passcode; and
verifying the call by sending a match condition message in response to the determination that the second passcode sent by the second device matches the first passcode.

16. The computer-readable storage medium of claim 15, wherein the match condition is sent to a server that is configured to, when the server receives a non-match condition message that indicates that there was not a match between passcodes, deny access, to a caller, to an account associated with the non-match condition message.

17. The computer-readable storage medium of claim 15, wherein the first passcode is randomly generated.

18. The computer-readable storage medium of claim 15, wherein the match condition is sent to a server that, in response to receiving the match condition, grants the second person to access the account of the first person.

19. The computer-readable storage medium of claim 15, wherein the sending the message that includes the identifier includes sending an encrypted version of the first passcode.

20. The computer-readable storage medium of claim 15, wherein the message that includes the identifier and the match condition are sent to a server that is configured to:
store an indication of the message that includes the identifier for a pre-determined duration of time; and
authenticate the second person in response to receiving the match condition message within the pre-determined duration of time.

* * * * *